United States Patent [19]

Uda et al.

[11] Patent Number: 5,774,615

[45] Date of Patent: Jun. 30, 1998

[54] OPTICAL FIBER WITH A METAL LAYER TO MAINTAIN THE DESIRED SHAPE OF THE OPTICAL FIBER

[75] Inventors: Yoshito Uda; Toshiaki Kuroha, both of Osaka; Katsuhiko Kobayashi, Chiba, all of Japan

[73] Assignee: Topcon Corporation, Tokyo, Japan

[21] Appl. No.: 577,632

[22] Filed: Dec. 22, 1995

[30] Foreign Application Priority Data

Dec. 26, 1994 [JP] Japan .................................. 6-337851

[51] Int. Cl.⁶ ................................................. G02B 6/02
[52] U.S. Cl. ............................................................ 385/128
[58] Field of Search .................................... 385/128, 147

[56] References Cited

U.S. PATENT DOCUMENTS

| | | | |
|---|---|---|---|
| 4,390,589 | 6/1983 | Geyling et al. | 385/128 |
| 4,407,561 | 10/1983 | Wysocki | 385/128 |
| 4,432,607 | 2/1984 | Levy | 385/128 X |
| 4,466,697 | 8/1984 | Daniel | 385/128 X |
| 4,480,898 | 11/1984 | Taylor | 385/128 |
| 5,093,880 | 3/1992 | Matsuda et al. | 385/128 |
| 5,497,440 | 3/1996 | Croitoru et al. | 385/128 X |

*Primary Examiner*—Akm E. Ullah
*Attorney, Agent, or Firm*—Foley & Lardner

[57] ABSTRACT

An optical fiber and method of manufacturing the same comprising a light transmitting portion having a first end, a second end, and an outer surface. A foundation layer is disposed on a portion of the outer surface of the light transmitting portion. A protective layer is disposed over the foundation layer. The protective layer has a thickness greater than the thickness of the foundation layer.

10 Claims, 4 Drawing Sheets

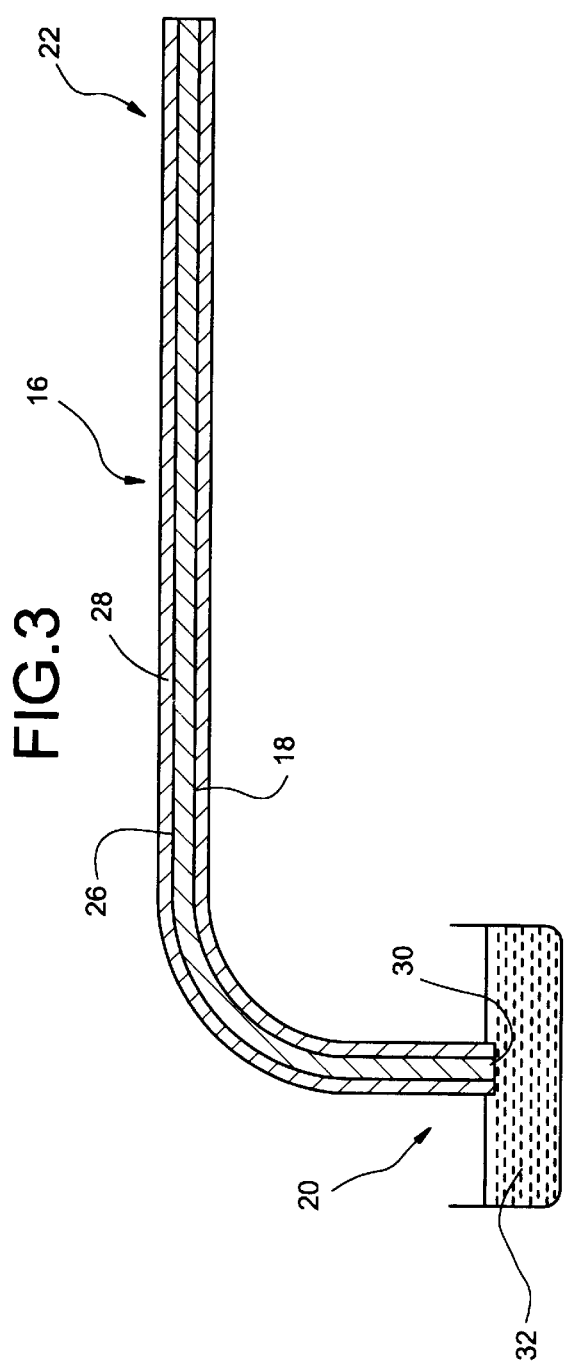
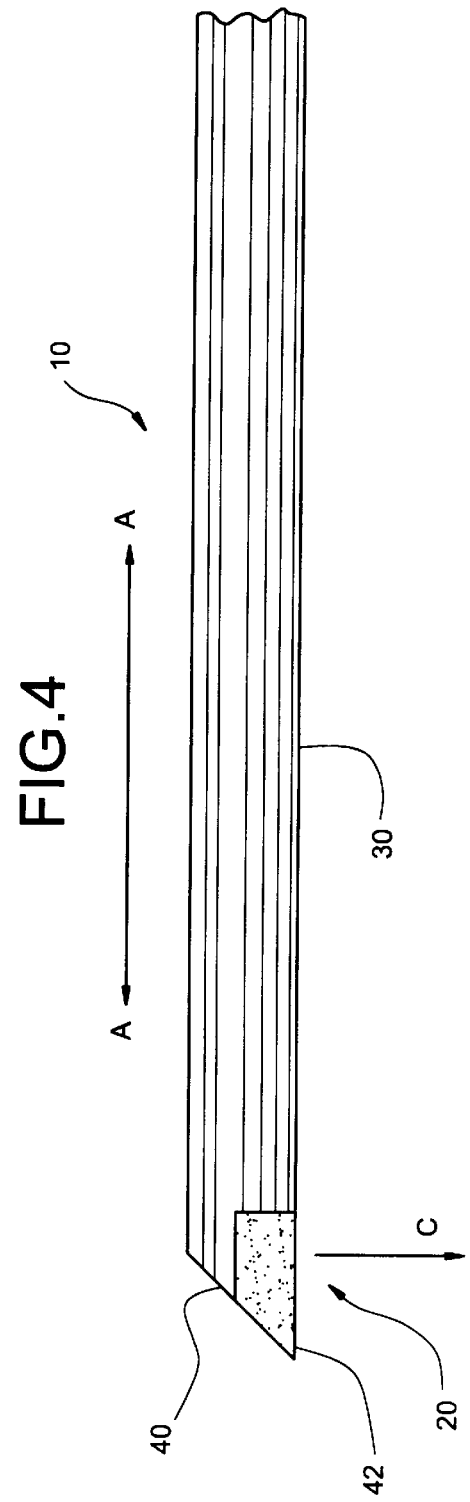

OPTICAL FIBER WITH A METAL LAYER TO MAINTAIN THE DESIRED SHAPE OF THE OPTICAL FIBER

BACKGROUND OF THE INVENTION

1. Field of the Invention

This invention relates to a novel optical fiber and a method of manufacturing the same. More specifically, this invention relates to a novel optical fiber capable of maintaining a desired shape without a decrease in mechanical strength or loss of light transmission properties, and a method of manufacturing the same.

2. Background of the Invention

Fiber optics have been used in various fields requiring the transmission of light signals, including telecommunications and medicine. For example, optical fibers may be used in endoscopic procedures to examine a patient's body cavities. They may also be used to perform laser surgery, to coagulate blood, or to cut or vaporize an organ.

Optical fibers may also include a resin, or plastic, jacket. These non-rigid fibers, however, do not function well as examining probes or endoscopes because they will not maintain a desired shape. To make the fibers rigid, past practice has been to insert the fibers into a metal tube. These fibers have limited utility, however. Channeling a metal tube over the core of any optical fiber increases the fiber's radius and makes it difficult to insert the optical fiber into an object.

Resin-molded optical fibers present other difficulties. They cannot be used in high temperature conditions, for example as spectrum measurement probes in high temperature furnaces. The resin-molded fibers can only withstand temperatures up to approximately 302 kelvins (or 150 degrees celsius) because the resin does not have good heat resistance.

In some operative contexts, it is desirable to bend the optical fiber so that a light-emitting end of the fiber faces a desired direction. One end of the optical fiber may be positioned at an angle relative to the optical axis of the optical fiber, such as ninety degrees from the optical axis. But, the optical fiber may not be bent at too great an angle. As the radius of curvature of the optical fiber increases, the optical fiber may break, or there may be a loss of light transmission.

Some prior art optical fibers incorporate a concave lens and a rectangular prism at one end to direct light emanating from the end of the fiber in a desired direction. The lens and prism may converge the light from the optical fiber and direct it to illuminate a desired target. However, the lens and the prism cause a loss of light transmission. Moreover, it is expensive to manufacture optical fibers having lenses and prisms.

The difficulties suggested in the preceding are not intended to be exhaustive but rather are among many which tend to reduce the effectiveness of optical fibers. Other noteworthy problems may also exist; however, those presented above should be sufficient to demonstrate that such apparatuses and methods of manufacture appearing in the past will admit to worthwhile improvement.

SUMMARY AND OBJECTS OF THE INVENTION

Accordingly, it is therefore a general object of the invention to provide an optical fiber and method of manufacturing the same which will obviate or minimize difficulties of the type previously described.

It is an object of the invention to provide an optical fiber and method of manufacturing the same which maintains a desired shape without a decrease in mechanical strength or loss in light transmission properties.

It is another object of the invention to provide an optical fiber and method of manufacturing the same which may alter the direction of light emanating from a light source.

It is still another object of the invention to provide an optical fiber and method of manufacturing the same which may be easily inserted into a target area of an object, such as a patient's body cavity.

It is a further object of the invention to provide an optical fiber and method of manufacturing the same which may be used in high temperature environments, such as furnaces.

It is still a further object of the invention to provide an optical fiber and method of manufacturing the same which is economical, durable, and easily utilized by a physician or other user.

A preferred embodiment of the invention which is intended to accomplish at least some of the foregoing objects includes an optical fiber having a light transmitting portion. The light transmitting portion has a first end, a second end, and an outer surface. A foundation layer is disposed on a portion of the outer surface of the light transmitting portion. A protective layer is then disposed over the foundation layer. The protective layer is rigid and has a thickness greater than the thickness of the foundation layer.

A method of manufacturing an optical fiber in accordance with the invention includes the steps of forming a light transparent portion; applying a foundation layer on a portion of an outer surface of the light transmitting portion; and applying a protective layer on the foundation layer where the protective layer has a thickness greater than the thickness of the foundation layer.

Another method of manufacturing an optical fiber in accordance with the invention includes the steps of forming a light transparent portion having a first end and a second end; forming an inclined end surface at the first end where the inclined end surface is inclined relative to an axis of the light transmitting portion; applying a first metal layer to a portion of an outer surface of the light transmitting portion; and applying a second metal layer on the first metal layer where the second metal layer has a thickness greater than the thickness of the first metal layer.

A further method of manufacturing an optical fiber in accordance with the invention includes the steps of forming a light transmitting portion having a first end and a second end; forming an inclined end surface at the first end of the light transmitting portion; fastening an adhesive to a portion of an outer surface of the light transmitting portion; coating the light transmitting portion with a first metal layer; coating the light transmitting portion with a second metal layer where the second metal layer has a thickness greater than the thickness of the first metal layer; and removing the adhesive from the portion of the light transmitting portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute apart of the specification, illustrate a presently preferred embodiment of the invention, and, together with the general description given above and the detailed description of the preferred embodiment given below, serve to explain the principles of the invention.

FIG. 3 is a side view, in cross section, of an optical fiber as shown in FIG. 2 partially immersed in an electrolyte solution to remove a foundation layer and a protective layer from an end of the optical fiber;

FIG. 4 is a side elevation view of an optical fiber with an inclined end surface in accordance with the invention;

DETAILED DESCRIPTION OF THE PREFERRED EMBODIMENTS

Figure 1:
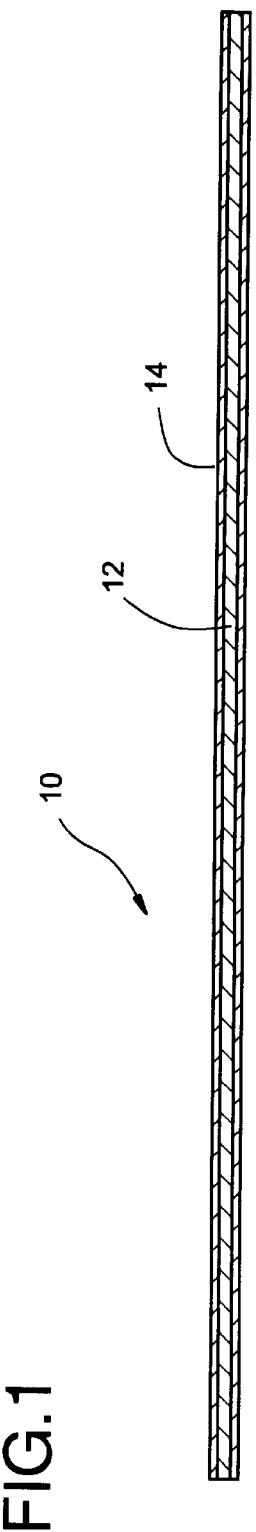
FIG. 1 is a side view, in cross section, of a conventional optical fiber.

Referring now to the drawings, wherein like numerals indicate like parts, and initially to FIG. 1, there will be seen an optical fiber, generally indicated 10. This optical fiber includes a core 12 and a resin jacket 14 disposed on core 12. Core 12 may be composed of crystal fiber or compound glass fiber. Optical fiber 10 is fabricated by drawing the fiber from a molten preform and coating it with resin. In this invention, a conventional optical fiber as shown in FIG. 1 may be used. It will be understood that any type of optical fiber may be utilized in the present invention, including fibers with a core surrounded by a cladding and those with only a core. For example, suitable optical fibers include step-index fibers, gradient-index fibers, single mode fibers, and multimode fibers.

Figure 2:
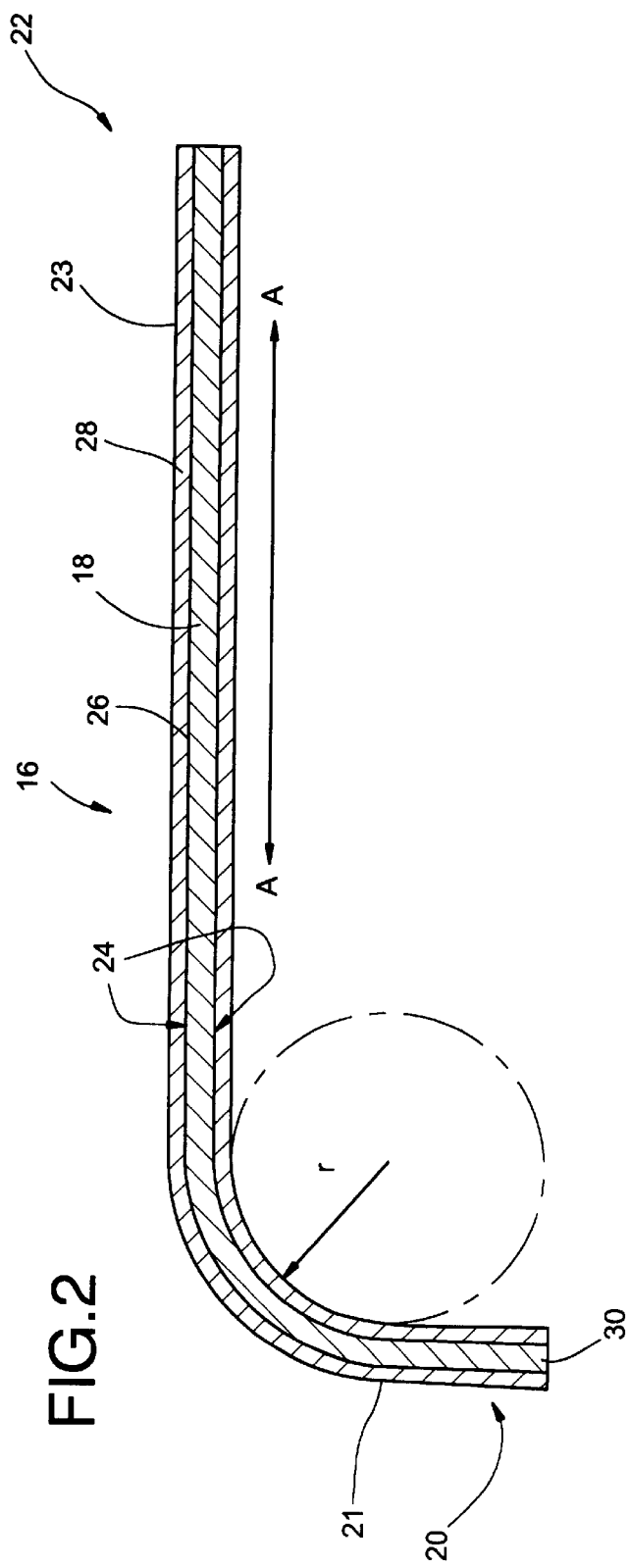
FIG. 2 is a side view, in cross section, of a light transmitting portion of an optical fiber bent in a desired shape in accordance with the invention.

Turning now to FIG. 2, a light transmitting portion, generally indicated 16, of optical fiber is shown in accordance with the invention. Light transmitting portion 16 includes a glass core 18 preferably composed of crystal or compound glass. Light transmitting portion 16 has a first end 20, a second end 22, and an outer surface 24. The core operably transmits light from a light source to a desired target area. A foundation layer 26 is disposed on a part of outer surface 26 of light transmitting portion 16. Foundation layer 26 forms a first metal layer and is conductive. A protective layer 28 is disposed over foundation layer 26. Protective layer 28 provides a second metal layer. Protective layer 28 has a thickness greater than the thickness of foundation layer 26.

Where the light source is relatively small, such as 2–4 $\mu$m, a single mode optical fiber preferably is used. First end 20 of light transmitting portion 16 may be bent at a desired angle relative to an optical axis of optical fiber 10. Line A—A indicates the optical axis of optical fiber 10. First end 20 may be bent at several radii of curvature, depending on the desired light pathway. FIG. 2, for example, shows first end 20 bent at approximately ninety degrees from the optical axis A—A. First end 20 of light transmitting portion 16 is bent by heating light transmitting portion 16.

Prior to coating outer surface 24 of light transmitting portion 16 with foundation layer 26 and protective layer 28, light transmitting portion 16 is bent so that first end 20 is moved to a desired position, such as ninety degrees from its original position. The part of light transmitting portion 16 of optical fiber 10 extending from the bent portion to first end 20 is a first leg 21. The part of light transmitting portion 16 of optical fiber 10 extending from the bent portion to second end 22 is second leg 23. Light transmitting portion 16 may be bent so that first leg 21 is substantially perpendicular to second leg 23. End surface 30 of first end 20 may be inclined relative to an axis of first leg 21, such as at a forty-five degree angle, and then polished. Then, the resin jacket 14 shown in FIG. 1 of light transmitting portion 16 is removed.

After any necessary polishing and removing of resin jacket 14, foundation layer 26 is applied to a portion of outer surface 24. Foundation layer 26 forms a first coating over light transmitting portion 16. Foundation layer 26 is preferably composed of a metallic substance with a thickness of only a few $\mu$m, such as 2–4 $\mu$m. Foundation layer 26 is disposed on a dielectric substance, such as glass or plastic. Foundation layer 26 may be applied to outer surface 24 of light transmitting portion 16 by any conventional plating technique, including electroless plating, vacuum coating, sputtering, and chemical vapor deposition.

After applying foundation layer 26 to outer surface 24, protective layer 28 is applied. Protective layer 28 forms a protective coating over foundation layer 26. Protective layer 28 may be applied, for example, by electro-plating or ion-plating techniques. Suitable materials for foundation layer 26 and protective layer 28 include copper, nickel, aluminium, silver, and gold. Nickel is particularly suitable for protective layer 28.

As the radius of curvature, labeled "r" in FIG. 2, of light transmitting portion 16 increases or numerical aperture (NA) increases, the loss of light decreases. For example, if light transmitting portion 16 bends at a numerical aperture of more than 0.2 and has a radius of curvature more than approximately 5 mm, the loss of light due to the bend is approximately 0 dB.

End surface 30 of first end 20 of light transmitting portion 16 preferably is polished. End surface 30 is immersed in an electrolyte solution 32 with reverse polarity, as shown in FIG. 3, to remove foundation layer 26 and protective layer 28 from end surface 30.

In the embodiment shown in FIGS. 2 and 3, end surface 30 of first end 20 of light transmitting portion 16 is normal, or perpendicular, relative to the axis of first leg 21.

Figure 6:
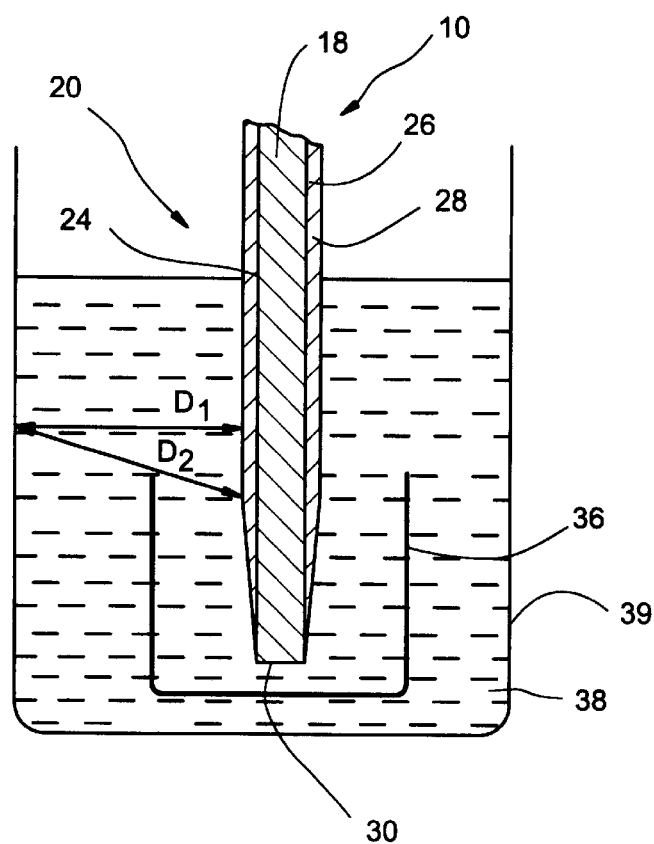
FIG. 6 is a side view, in cross section, of an optical fiber immersed in an electrolyte solution to form a tapered shape on an end of the fiber in accordance with the invention.
Figure 7:
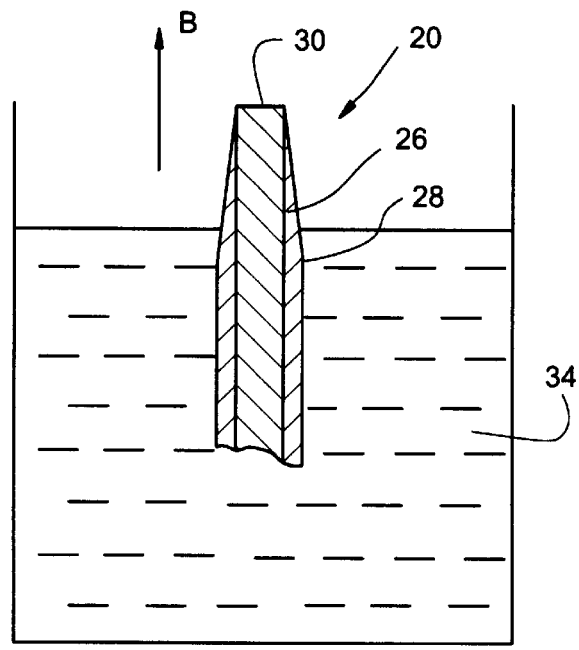
FIG. 7 is a side view, in cross section of an optical fiber immersed in an electrolyte solution to form a tapered shape on an end of the fiber in accordance with the invention.

In another embodiment of the invention, protective layer 28 tapers, or thins, near end surface 30 of first end 20, as shown in FIG. 7. To produce such tapering, light transmitting portion 16 coated with a conductive coating is immersed in an electrolyte solution 34 and withdrawn slowly in the direction of arrow B. Alternatively, first end 20 of light transmitting portion 16 may be placed in an isolation member 36 positioned in an electrolyte solution 38, as shown in FIG. 6. The thickness of protective layer 28 is inversely proportional to the distance of an electron pathway between outer surface 24 of first end 20 and a container wall 39, as will be explained further below. Isolation member 36 may be composed of glass, polyvinyl chloride, or any other suitable material.

Where first end 30 tapers, light transmitting portion 16 may be easily inserted into a patient's body cavity, or other object, because tapered first end 20 has a relatively small diameter.

Figure 5:
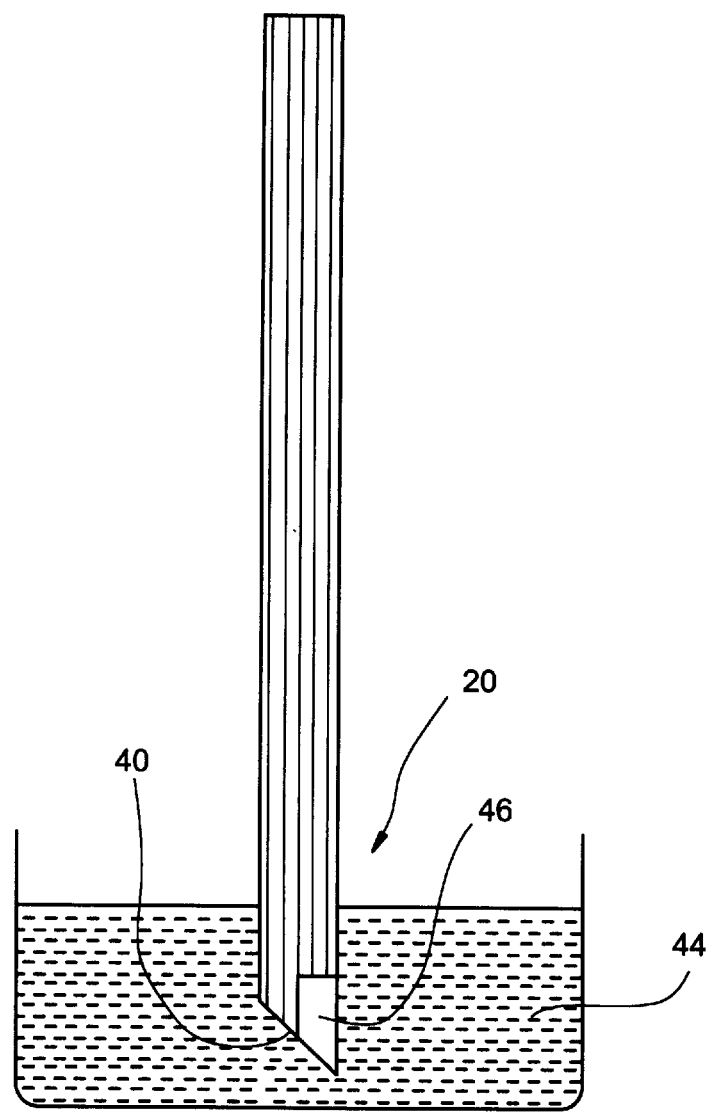
FIG. 5 is a side elevation view of an optical fiber immersed in an electrolyte solution in accordance with the invention.

In another embodiment of the invention, first end 20 may include an inclined end surface 40, as shown in FIGS. 4 and 5. Light transmitting portion 16 initially is formed with inclined end surface 40. Foundation layer 26 is then disposed on outer surface 24 of light transmitting portion 16. An adhesive 42, such as masking tape or other suitable dielectric material, is then positioned on a portion of outer surface 24 adjacent inclined end surface 40. Protective layer 28 is then disposed on foundation layer 26. Protective layer 28 cannot permeate the adhesive 42. After protective layer 28 is applied, adhesive 42 is removed, exposing the underlying foundation layer 26. First end 20 of light transmitting portion 16 is then immersed in a dilute acidic solution to remove the exposed foundation layer 26. The exposed foundation layer 26 may also be removed by immersing first end 20 into an electrolyte solution 44, as shown in FIG. 5.

One of ordinary skill in the art will recognize that other materials suitable for covering a portion of outer surface 24 may be substituted for adhesive 42. It will be understood, moreover, that the positioning of adhesive 42 may vary depending on the desired light pathway through first end 20 of light transmitting portion 16. Light will pass through first end 20 of light transmitting portion 16 only where foundation layer 26 and protective layer 28 are absent. Thus, altering the position of exposed area 46 alters the pathway of light.

Moreover, the angle of inclined end surface 40 of first end 20, which dictates the pathway of light transmitted through light transmitting portion 16, may be formed at any desired angle. It will be understood that end surface 30 of first end 20 of the bent optical fiber shown in FIGS. 2 and 3 may be polished or cut to form an inclined end surface similar to that shown in FIGS. 4 and 5.

First end 20 retains mechanical strength and heat resistance because of the relatively thick protective layer 28 disposed on foundation layer 26. The two metal layers 26 and 28 make the inclined end surface strong and durable. The surface may be polished and cleaned if it becomes contaminated through repeated use.

EMBODIMENT 1

A method of manufacturing an optical fiber with a bent light transmitting portion in accordance with the invention will now be described. Optical fiber 10 initially has a resin jacket 14. An end 20 of optical fiber 10 is cut normal to the optical axis of optical fiber 10, and a mirror surface is formed on the resulting end surface. In one example, core 18 is a multimode optical fiber 10 composed of crystal, or any other suitable glass composition, and has a core diameter of 100 $\mu$m, a cladding diameter of 140 $\mu$m, and a numerical aperture of approximately 0.26.

When heat is applied, first end 20 of optical fiber 10 softens. First end 20 may then be bent about a radius of curvature of approximately 0.197 inches (5 mm), until first end 20 is substantially perpendicular relative to optical axis A—A, as shown in FIG. 2. Jacket 14 of optical fiber 10 is then removed from first end 20 of light transmitting portion 16, which includes the bent portion of optical fiber 10.

Foundation layer 26 is disposed on outer surface 24 of light transmitting portion 16 of optical fiber 10. This layer may be applied via electroless plating, which deposits metal without using electric current.

First end 20 of light transmitting portion 16 is then immersed in a sensitizer liquid heated to 86 kelvins (30 degrees celsius) for approximately two minutes. The sensitizer liquid preferably comprises tin chloride at 5g–20 g/liter and hydrochloric acid at 1–5 ml/liter. First end 20 of light transmitting portion 16 is then immersed in an activator liquid heated at 86 kelvins (30 degrees celsius) for about two minutes. The activator liquid includes palladium chloride at 0.5g–1g/liter. First end 20 of optical fiber 10 is then washed with water.

First end 20 of light transmitting portion 16 next is immersed in an electroless nickel plating bath heated at 86–104 kelvins (30–40 degrees celsius) for five minutes. The nickel plating solution preferably comprises:

Nickel sulfate 30 g/liter;

Sodium phosphinate 20 g/liter; and

Ammonium Citrate Tribasic 50 g/liter.

A foundation layer 28 of nickel is then formed with a thickness of approximately 0.5 $\mu$m.

After foundation layer 28 is disposed on a portion of outer surface 24 of light transmitting portion 16, light transmitting portion 16 is immersed in an electrolyte solution having a current density of 10 A/dm$^2$ for approximately fifty minutes. This nickel plating solution comprises:

Nickel Sulfamate (H2NSO3) Ni 500 g/liter; and

Boric acid 30 g/liter. Optical fiber 10 is connected to a negative pole and serves as a cathode, and the electrolyte solution is connected to a positive pole. In one example, the container holding the electrolyte solution is connected to a positive pole and operates as an anode. This forms a protective layer 28 of nickel with a thickness of approximately 100 $\mu$m on outer surface 24 of light transmitting portion 16.

As shown in FIG. 3, end surface 30 of light transmitting portion 16 is immersed in an electrolyte solution, preferably a 3 percent potassium chloride solution. Optical fiber 10 is connected to a positive pole. Current flows through optical fiber 10 at 10 $\mu$A for several seconds, preferably 2–6 seconds. This removes foundation layer 26 and protective layer 28 from end surface 30, and end surface 30 then is capable of emitting light. Optical fiber 10 experiences no decrease in the intensity of light transferred along the fiber.

EMBODIMENT 2

Embodiment 2 describes an alternative method of manufacturing an optical fiber as shown in FIG. 7 in accordance with the invention. This embodiment produces an optical fiber having a tapered first end. In this embodiment, nickel foundation layer 26 is applied to optical fiber 10 in the same manner as disclosed in embodiment 1.

Optical fiber 10 is immersed in a nickel plating electrolyte solution with a current density of 10 A/dm$^2$ for fifty minutes to form protective layer 28. The nickel plating electrolyte solution essentially consists of:

Nickel Sulfamate 600 g/liter; and

Boric acid 30 g/liter; along with additives, such as a brightening agent Saccharin Sodium, and a pit proof agent Sodium Dodecyl Sulfate, in proper quantities. Optical fiber 10 is connected to a negative pole and serves as a cathode, and the container of electrolyte solution 34 is connected to a positive pole and serves as an anode. Protective layer 28 is then formed on optical fiber 10 with a thickness of approximately 100 $\mu$m. To apply protective layer 28, first end 20 of optical fiber 10 is immersed in the above electrolyte solution. During plating, first end 20 of optical fiber 6 is drawn gradually upward from the electrolyte solution. A tapered first end 20 results.

Where the length of first end 20 is 4 inches (10 cm), first end 20 should be drawn out of the electrolyte solution at a time equal to two-thirds of the total immersion time required to apply protective layer 28 to optical fiber 10. Where the thickness of protective layer 28 is 300 μm at its maximum, optical fiber 10 will have its minimum thickness, about 200 μm, adjacent end surface 30 of first end 20.

This optical fiber may be used as a measurement probe or medical probe. If this optical fiber is affixed to a ferrule, it may be used as the head of a high temperature thermosensor. It also may be used to observe an emission spectrum in an electric furnace heated at 900 degrees celsius without needing a special cooling device.

EMBODIMENT 3

FIG. 4 shows an optical fiber 10 which changes the pathway of light to illuminate a target area. Light travels downs the optical axis A—A of optical fiber 10 until it reaches first end 20. When the manufacturing process is complete, light may exit first end 20 at approximately a ninety degree angle relative to the optical axis A—A in the direction indicated by arrow C in FIG. 4.

In one example, the optical fiber preferably has a core diameter of 200 μm, and a cladding diameter of 240 μm. First end 40 of optical fiber 10 is formed with an inclined surface at approximately forty-five degrees. Inclined surface 40 is formed by polishing to create a mirror-like surface. Resin jacket 14 is stripped from optical fiber 10 at about 30 mm from end surface 40. First end 20 is then immersed in a sensitizer liquid, followed by immersion in an activator liquid. First end 20 is then washed with water and immersed in an electroless plating bath at 77 kelvins (25 degrees celsius) for ten minutes. The electroless plating solution comprises:

Copper Sulfate 30 g/liter;
Rochelle Salt (Potassium Sodium Tartrate) 100 g/liter;
Formaldehyde 30 ml/liter; and
Sodium Hydroxide 50 g/liter. This forms a foundation layer 26 of copper at a thickness of approximately 0.5 μm. Masking tape, or other suitable dielectric material, is attached to a portion of first end 20 adjacent inclined end surface 40. The masking tape is placed where it is desirable to emit reflected light. In this example, masking tape 42 extends along outer surface 24 of optical fiber 10 a distance of about 1 mm from end surface 42 and covers only half the circumference of outer surface 24.

First end 20 of optical fiber 10 is then immersed in the electrolyte solution discussed in connection with embodiment 1 with a current density of 10 A/dm$^2$ for fifty minutes to form protective layer 28 on foundation layer 26. Protective layer 28 forms on foundation layer 26 except where the masking tape, a dielectric, covers foundation layer 26. Protective layer 28 has a thickness of approximately 100 μm. Once protective layer 28 reaches the desired thickness, first end 20 is removed from the electrolyte solution, and the masking tape is removed to expose the underlying foundation layer 26. First end 20 is then immersed in a dilute nitric acid solution. This solution removes exposed foundation layer 26 to expose the fiber core.

When light with a wavelength of 0.83 μm is transmitted along the optical fiber, a reflection percentage at the reflection portion of the optical fiber core is more than eighty percent; thus, the loss of reflected light is low.

EMBODIMENT 4

In embodiment 4, foundation layer 26 of optical fiber 10 is formed by electroless nickel plating, instead of electroless copper plating.

This process is substantially the same as discussed in connection with embodiment 3, except electroless nickel plating is used instead of the electroless copper plating. When light with a wavelength of 0.83 μm is transmitted along an optical fiber having a copper foundation layer, a reflection percentage at the reflection portion of the optical fiber core is approximately forty to fifty percent.

EMBODIMENT 5

In this embodiment, optical fiber 10 is formed with a tapered first end 20 as shown in FIG. 6.

Foundation layer 26 on optical fiber 10 is formed in the same manner as described in connection with FIG. 2. Protective layer 28 on first end 20 is formed in the following way.

First end 20 is located in an isolator 36, preferably cylindrically shaped, surrounded by an electrolyte solution 38. Isolator 36 may be composed of glass or polyvinyl chloride, or any other suitable dielectric material. Isolator 36 may also be configured in other shapes, such as an inverted cone.

Suppose $D_1$ equals the distance of an electron pathway between container wall 39 and outer surface 24 of a portion of first end 20 located outside isolator 36, and $D_2$ equals the distance between container wall 39 and outer surface 24 of a portion of first end 20 located within isolator 36. The thickness of protective layer 28 is greater where the distance equals $D_1$ than where it equals $D_2$. In other words, the thickness of protective layer 28 is inversely proportional to the distance between container wall 39 and outer surface 24. Isolator 36 operates to increase the distance between container wall 39 and outer surface 24, thereby decreasing the thickness of protective layer 28 applied to outer surface 24. First end 20 remains immersed in electrolyte solution 38 until protective layer 28 reaches a desired thickness.

EMBODIMENT 6

In embodiment 6, optical fiber 10 is formed with a tapered first end 20 as shown in FIG. 7. Foundation layer 26 is applied to outside surface 24 of optical fiber 10 in the manner described in connection with embodiment 2. Protective layer 28 is formed with a tapered shape in the following way.

First end 20 of optical fiber 10 is immersed in an electrolyte solution 34 and then is withdrawn gradually from the solution.

Additional advantages and modifications will readily occur to those skilled in the art. Therefore, the invention in its broader aspects is not limited to the specific details, and representative devices, shown and described herein. Further, concentrations given herein of components of the various solutions are approximate. Accordingly, various modifications may be made without departing from the spirit or scope of the general inventive concept as defined by the appended claims and their equivalents.

What is claimed is:

1. An optical fiber comprising:
    a light transmitting portion having a first end, a second end, and an outer surface, said light transmitting portion being formed in a desired shape;
    at least two metal layers, one of said at least two metal layers applied directly to said outer surface of said light transmitting portion and the other of said at least two metal layers applied to said one metal layer to maintain the desired shape of said light transmitting portion.

2. An optical fiber according to claim 1, wherein:

said one metal layer comprises a foundation layer disposed on a portion of said outer surface of said light transmitting portion, and said other metal layer comprises a protective layer disposed over said foundation layer, said protective layer having a thickness greater than the thickness of said foundation layer.

3. An optical fiber according to claim 1 wherein:

said first end of said light transmitting portion has an inclined end surface, said inclined end surface being inclined relative to an axis of said light transmitting portion.

4. An optical fiber according to claim 1 wherein:

said optical fiber is curved, and said optical fiber further comprises a first leg extending toward said first end of said light transmitting portion and a second leg extending toward said second end of said light transmitting portion, said first leg and said second leg forming the desired shape of said light transmitting portion.

5. An optical fiber according to claim 4 wherein:

said first end of said light transmitting portion has an inclined end surface, said inclined end surface being inclined relative to an axis of said light transmitting portion along said first leg.

6. An optical fiber according to claim 4 wherein:

said first leg is substantially perpendicular to said second leg.

7. An optical fiber according to claim 2 wherein:

said first end of said light transmitting portion has an end surface; and said protective layer tapers toward said end surface of said first end.

8. An optical fiber according to claim 1 wherein said optical fiber comprises:

at least one of a fiber for illuminating a subject with light from a light source and a fiber for receiving light from a subject.

9. An optical fiber according to claim 1 wherein:

said light transmitting portion is composed of at least one of crystal and compound glass.

10. A light transmitting device comprising:

a light transmitting portion having a first end, a second end, and an outer surface;

a metal foundation layer disposed directly on a portion of said outer surface of said light transmitting portion; and a metal protective layer disposed over said foundation layer, said protective layer having a thickness greater than the thickness of said foundation layer.

* * * * *